(12) United States Patent
McKoy

(10) Patent No.: US 7,059,372 B1
(45) Date of Patent: Jun. 13, 2006

(54) ASSEMBLY FOR INFLATING A TIRE

(76) Inventor: Franklyn R. McKoy, 638A Romford Road Manor Park, London, E12 5AQ (GB)

( * ) Notice: Subject to any disclaimer, the term of this patent is extended or adjusted under 35 U.S.C. 154(b) by 12 days.

(21) Appl. No.: 10/754,936

(22) Filed: Jan. 12, 2004

(51) Int. Cl.
*B60C 23/10* (2006.01)

(52) U.S. Cl. ...................... 152/415; 417/233; 280/201; 137/223

(58) Field of Classification Search .............. 152/415, 152/416, 418, 419, 427; 417/233; 280/201, 280/288.4; 137/223
See application file for complete search history.

(56) References Cited

U.S. PATENT DOCUMENTS

| | | | |
|---|---|---|---|
| 624,417 A * | 5/1899 | Wickersham et al. ....... | 152/420 |
| 797,447 A * | 8/1905 | Merry ......................... | 152/421 |
| 1,169,705 A | 1/1916 | Wilkes | |
| 1,349,671 A * | 8/1920 | Hultin ......................... | 152/420 |
| 4,546,990 A * | 10/1985 | Harriger ...................... | 280/216 |
| 5,257,553 A | 11/1993 | Cheng | |
| 5,318,317 A | 6/1994 | Hopper | |
| 5,342,177 A * | 8/1994 | Cheng ......................... | 417/233 |
| 5,397,144 A | 3/1995 | Mirand et al. | |
| 5,626,072 A | 5/1997 | Mirand et al. | |

* cited by examiner

*Primary Examiner*—Frantz F. Jules

(57) ABSTRACT

An assembly for inflating a tire includes a pump assembly that includes a housing having an air inlet and an air outlet. A conduit is fluidly coupled to the air outlet. The housing has a first end wall, a second end wall and a peripheral wall. A bracket is attached to the housing and is positioned on the peripheral wall for removably securing the housing to a spoke of a tire. The actuator includes a disc rotatably coupled to the pump assembly wherein rotation of the disc actuates the pump assembly. A valve assembly is fluidly couples the conduit to a valve stem of the tire. A plate is removably attached to a frame of a bicycle such that an axle of the tire extends through the plate. The plate is selectively abutted against the disc such that the disc rotates when abutted the plate and rotated around the axle.

5 Claims, 5 Drawing Sheets

US 7,059,372 B1

ASSEMBLY FOR INFLATING A TIRE

BACKGROUND OF THE INVENTION

1. Field of the Invention

The present invention relates to tire inflating devices and more particularly pertains to a new tire inflating device for automatically inflating a bicycle tire while the bicycle is being ridden.

2. Description of the Prior Art

The use of tire inflating devices is known in the prior art. These, generally, having fallen into the category of devices which have been incorporated into the gears or chair of the bicycle. These include U.S. Pat. No. 3,342,177 which is integrated with the wheel assembly of a bicycle, or motorcycle, tire. U.S. Pat. No. 5,626,072 describes a device that is positioned on the chain of bicycle whereby the motion of the chain around the bicycle gears is utilized to actuate the pump.

While these devices fulfill their respective, particular objectives and requirements, the need remains for a device that is more easily retrofitted to an existing bicycle frame for allowing a person to selectively inflate a bicycle tire while it is being ridden. Such a device should not be integrated into the wheel assembly or gears of the bicycle as such integration is costly, not easily retrofitted and may inhibit the performance and efficiency of the bicycle.

SUMMARY OF THE INVENTION

The present invention meets the needs presented above by utilizing a pump that is removably attached to the spoke of a tire and a plate removably mounted on the frame of the bicycle for engaging a pump actuator. Wherein a user may selectively place the plate in contact with the actuator such that the rotation of the tire causes the actuator to eject compressed air. This allows the user to also disengage the plate so that no efficiency is lost when the tire is not being inflated.

To this end, the present invention generally comprises a pump assembly that includes a housing having an air inlet and an air outlet. A conduit is fluidly coupled to the air outlet. The housing has a first end wall, a second end wall and a peripheral wall extending between the first and second ends walls. A bracket is attached to the housing and is positioned on the peripheral wall. The bracket is adapted for removably securing the housing to a tire spoke such that a secured spoke is orientated perpendicular to the first end wall. An actuator is mechanically coupled to the pump assembly for selectively forcing compressed air outwardly through the air outlet. The actuator includes a disc rotatably coupled to the pump assembly wherein rotation of the disc actuates the pump assembly. A rotational axis of the disc is orientated perpendicular to the first end wall of the housing. A valve assembly is fluidly coupled to the conduit and is removably coupled to a valve stem of the tire. A plate is removably attached to a frame of a bicycle such that an axle of the tire extends through the plate. The plate is selectively abutted against the disc such that the disc rotates when abutted the plate and rotated around the axle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
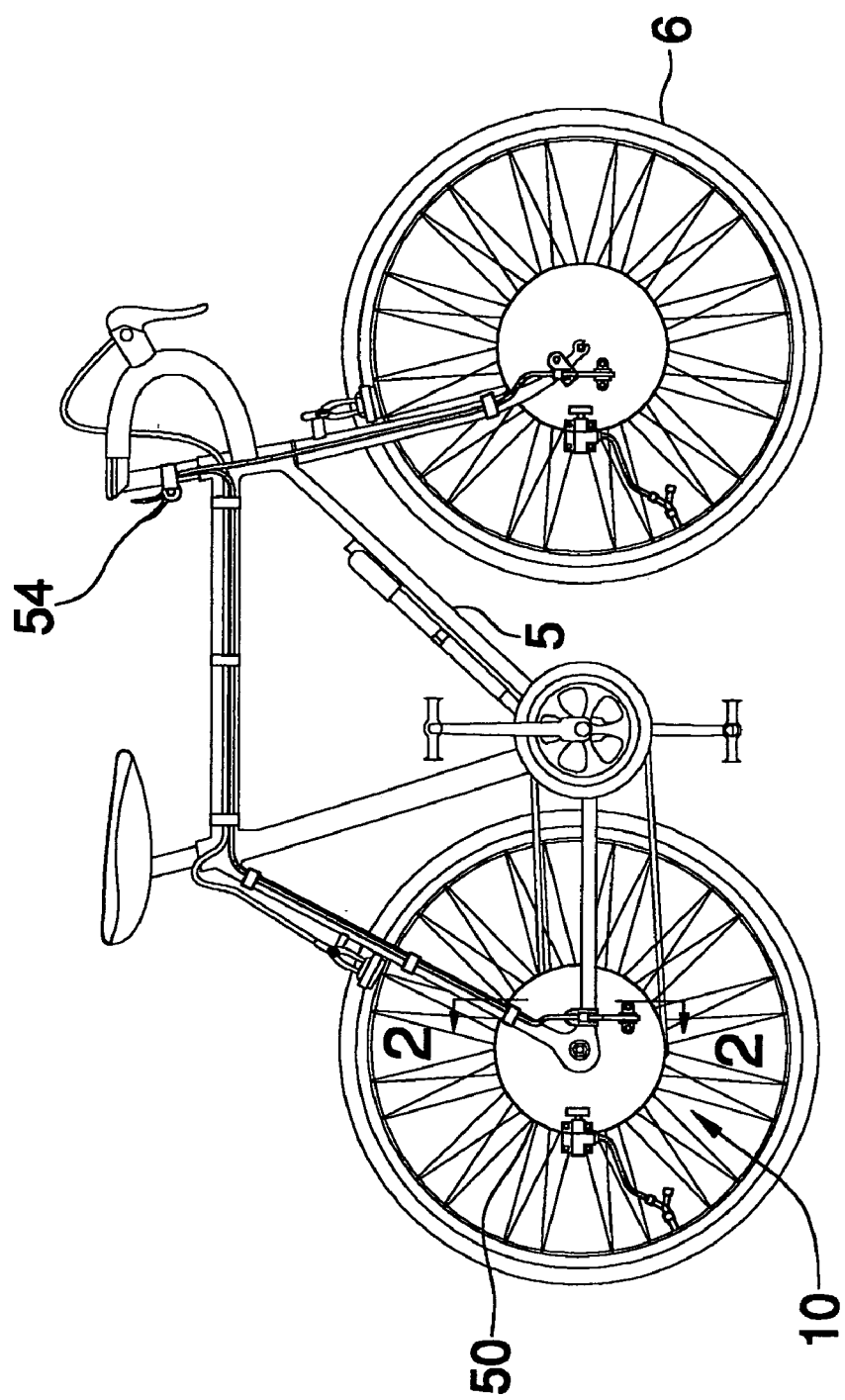
FIG. 1 is a schematic side view of an assembly for inflating a tire according to the present invention.
Figure 2:
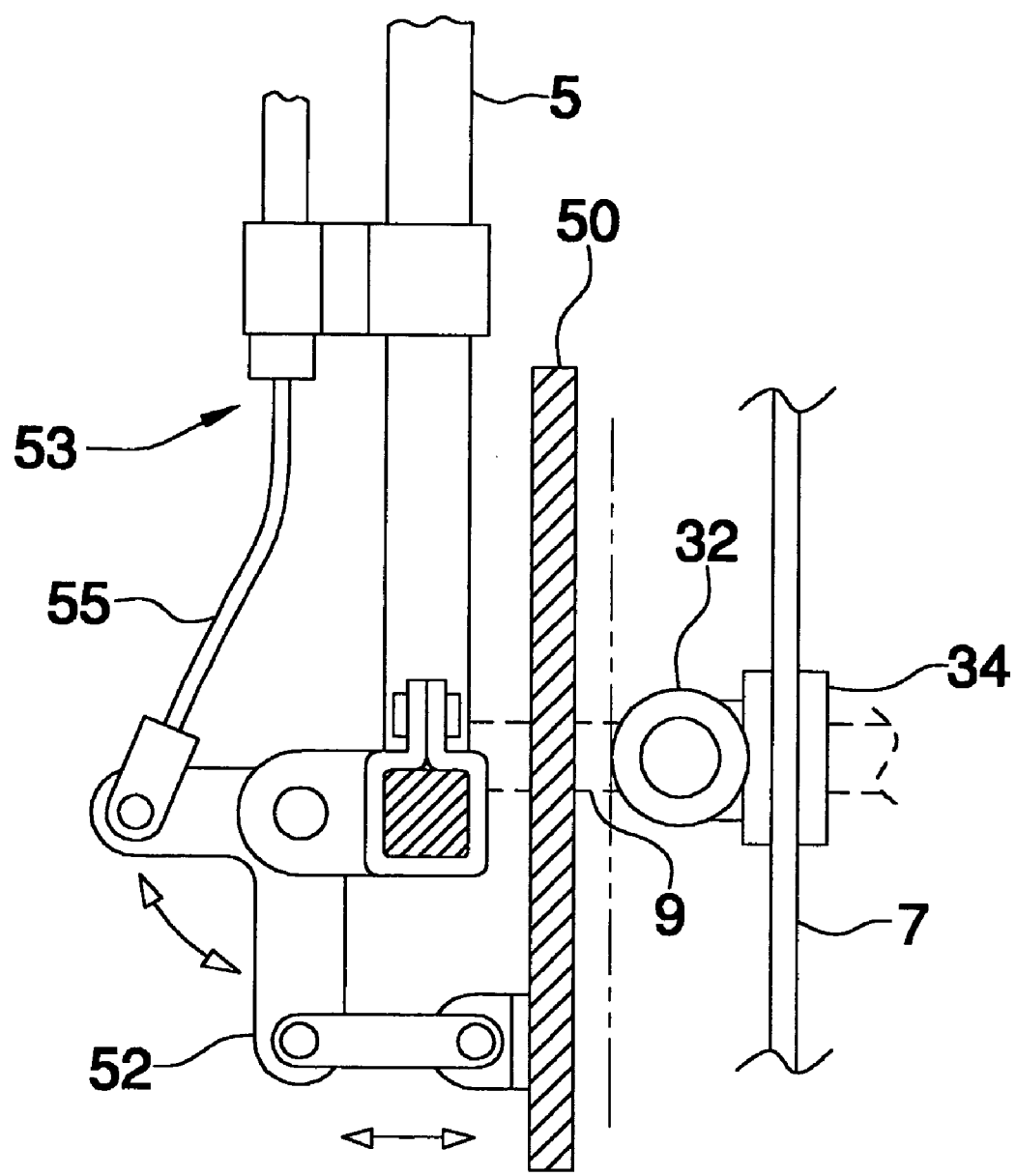
FIG. 2 is a schematic cross-sectional view taken along line 2—2 of FIG. 1 the present invention.
Figure 3:
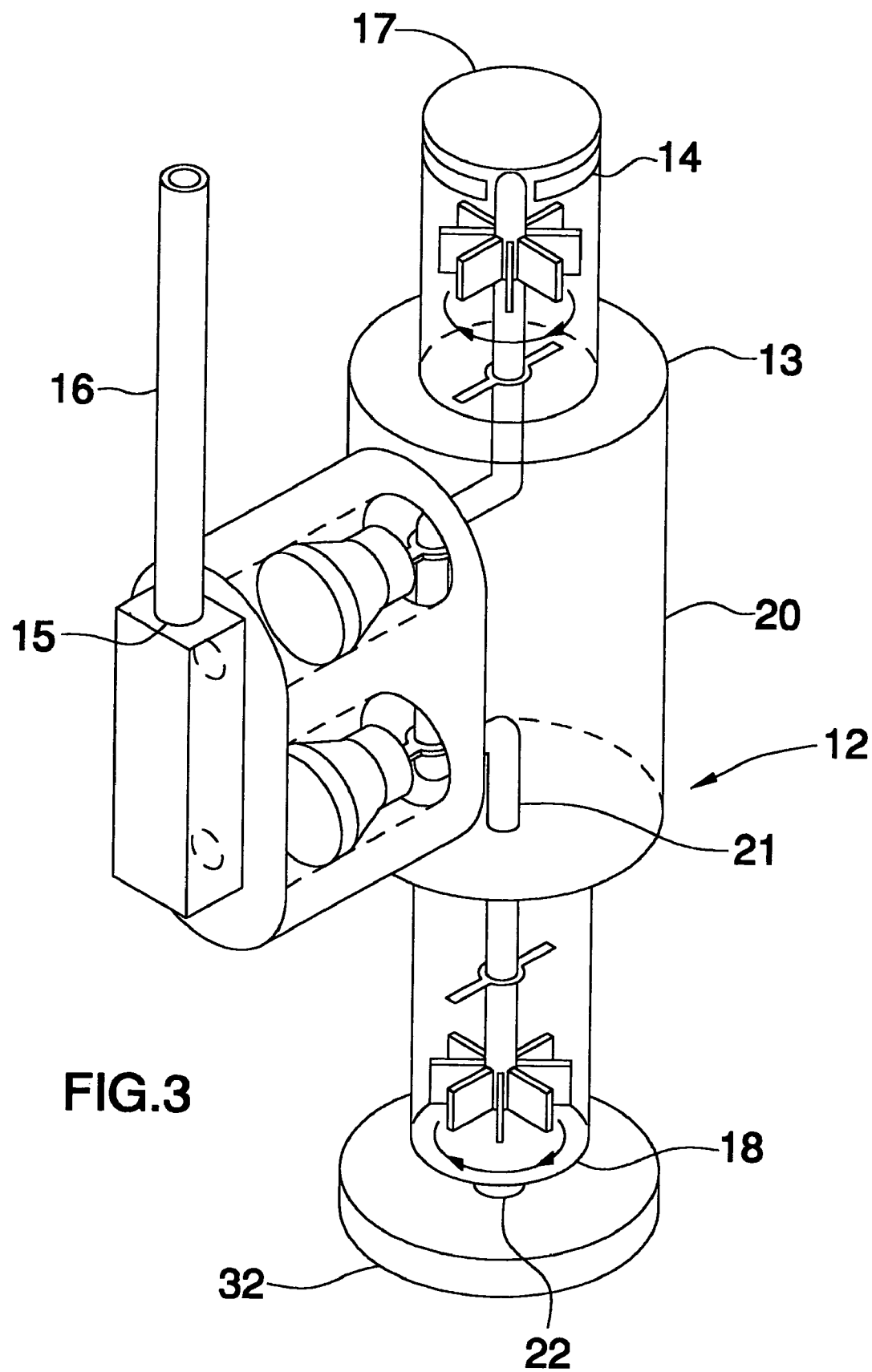
FIG. 3 is a schematic perspective view of a housing and interior of a pump assembly of the present invention.
Figure 4:
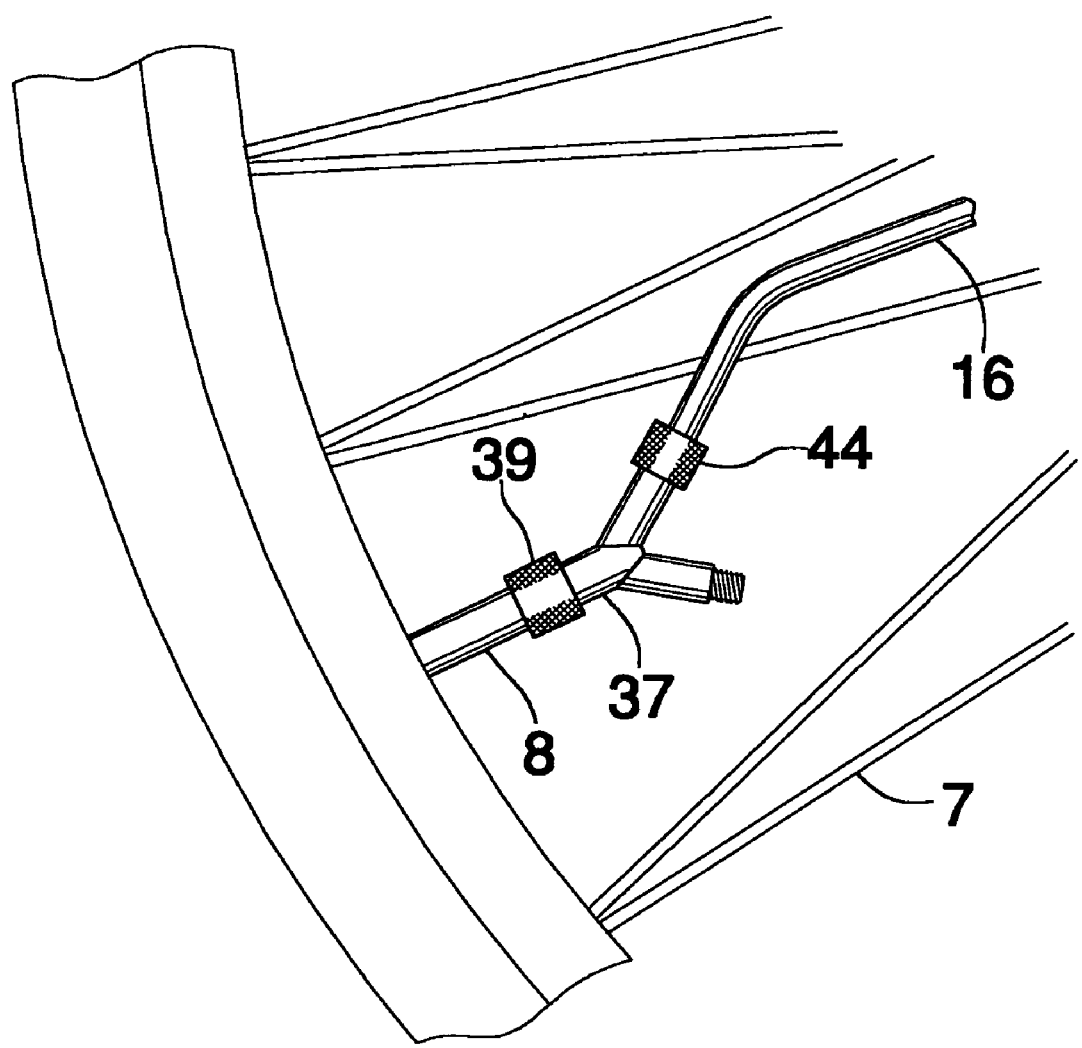
FIG. 4 is a schematic side environmental view of the valve assembly of the present invention.
Figure 5:
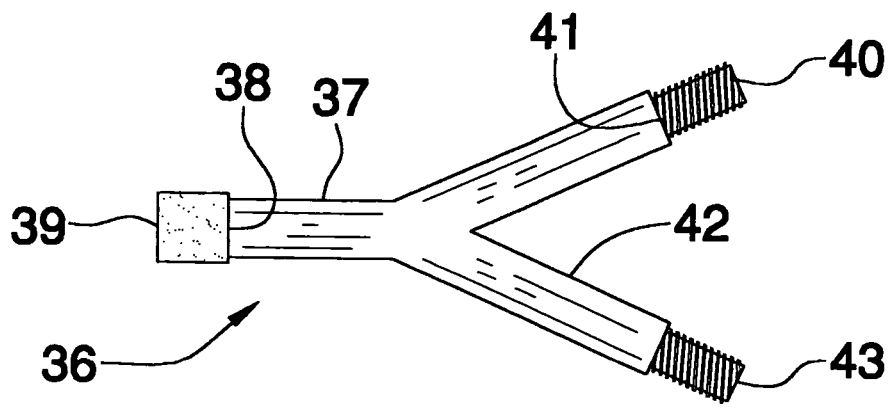
FIG. 5 is a schematic side view of the valve assembly of the present invention.
Figure 6:
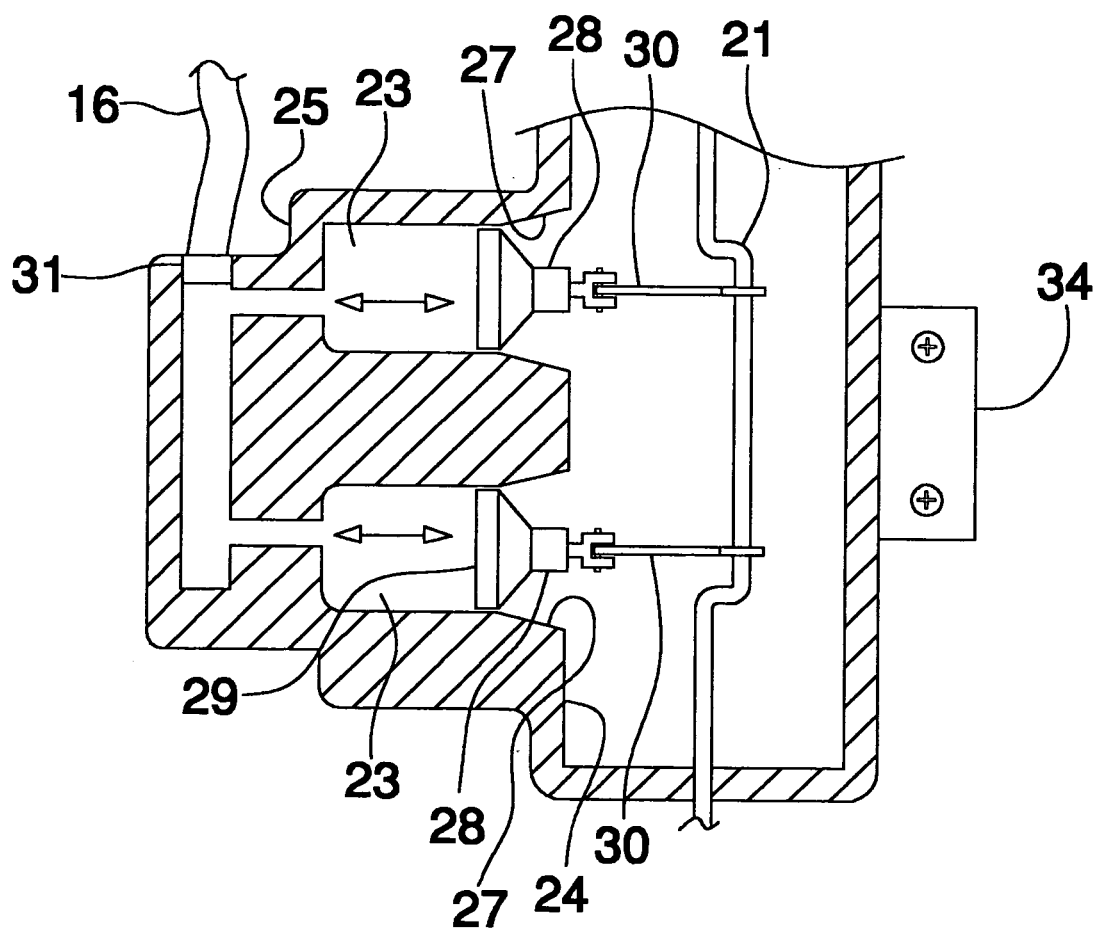
FIG. 6 is a schematic side cross-sectional view of the pump assembly of the present invention.

With reference now to the drawings, and in particular to FIGS. 1 through 6 thereof, a new tire inflating device embodying the principles and concepts of the present invention and generally designated by the reference numeral 10 will be described.

As best illustrated in FIGS. 1 through 6, the assembly for inflating a tire 10 generally includes a pump assembly 12 that includes a housing 13. The housing 13 has an air inlet 14 and an air outlet 15. A conduit 16 is fluidly coupled to the air outlet 15. The conduit 16 is preferably an elongated tube. The housing 13 has a first end wall 17, a second end wall 18 and a peripheral wall 20 extending between the first 17 and second 18 ends walls. A crankshaft 21 is mounted in the housing 13 and has a free end 22 extending outwardly of the first end wall 17. Preferably two cylinders 23 are positioned in the peripheral wall 20 and extend into an inner surface 24 of the peripheral wall 20 toward an outer surface 25 of the peripheral wall 20. The cylinders 23 are positioned adjacent to each other and extend in the same direction with respect to each other. The cylinders 23 each have a widened portion 27 abutting the inner surface 24. Each of a pair of pistons 28 is positioned within one of the cylinders 23. Each of a pair of arms 30 is attached to one of the pistons 28 and pivotally coupled to the crankshaft 21 such that the pistons 28 simultaneously move toward and away from the outer surface 25 as the crankshaft 21 is rotated. The widened portions 27 have a greater diameter than the pistons 28 to allow air into the cylinders 23 when an inner end 29 of the pistons 28 is positioned in the widened portions 27. When the pistons 28 are extended back into the cylinders 23, the air in the cylinders 23 is forced outwardly of the air outlet 15 which is fluidly coupled to the cylinder 23. Preferably, a one-way valve 31 is fluidly coupled to the air outlet 15 to prevent air from moving back into the cylinders 23 through the air outlet 15.

An actuator 32 is mechanically coupled to the pump assembly 12 for selectively forcing compressed air outwardly through the air outlet 15. The actuator 32 includes a disc rotatably coupled to the pump assembly wherein rotation of the disc, or actuator 32, actuates the pump assembly 12. A rotational axis of the disc, or actuator 32, is orientated perpendicular to the first end wall 18 of the housing 13. The free end 22 of the crankshaft 21 is attached to the disc 32 and forms an axle of the disc 32 so that the crankshaft 21 is rotated as the disc 32 is rotated. This rotation moves the pistons 28 and forces air out of the cylinders 23 and outwardly through the air outlet 15.

A bracket 34 is attached to the housing 13 and is positioned on the peripheral wall 20. The bracket 34 is adapted for removably securing the housing 13 to a spoke 7 of a bicycle 5 such that a secured spoke 7 is orientated parallel to the first end wall 18.

A valve assembly 36 is fluidly coupled to the conduit 16 and is removably coupled to a valve stem 8 of the tire 6. The valve assembly 36 includes a tubular member 37 having first end 38 having a female coupler 39 attached thereto for selectively coupling the tubular member to the valve stem 8. A male coupler 40 is fluidly coupled to a second end 41 of the tubular member four coupling to a female coupler 44 of the conduit 16. A secondary inlet 42 is fluidly coupled to the tubular member 37. A male coupler 43 is attached to a free end of the secondary inlet 42 and comprises a one-way valve for allowing air flow into the secondary inlet 42 and into the tubular member 37. The secondary inlet may be used for fluidly coupling a conventional pump to the tubular member 37 or for releasing air from the tire 6.

A plate 50 is removably attached to a frame of a bicycle 5 such that an axle 9 of the tire 6 extends through the plate 50. The plate 50 is selectively abutted against the disc 32 such that the disc 32 rotates when it abuts the plate 50 and rotates around the axle 9 with the spoke 7. A lever assembly 52 is attached the plate 50 for selectively moving the plate 50 in a first position abutting the disc 32 and a second position spaced from the disc 32. A lever actuator 53 is mechanically coupled to the lever assembly 52 for actuating the lever assembly 52. The lever actuator 53 is removably attached to the frame of the bicycle 5. The lever actuator 53 preferably includes a handle 54 attached to a cable 55. The cable 55 is attached to the lever assembly 52 for moving the plate 50 toward or away from the disc 32. The plate 50 may be attached to the lever assembly 52 instead or being directly attached to the frame of the bicycle 5.

In use, the user preferably mounts two assemblies 10 on a bicycle 5 so that each tire 6 has one of the assemblies 10 mounted thereon. The assemblies 10 are fluidly coupled to the tires 6. If a tire 6 begins to loose air pressure or is low on air pressure, the user moves the appropriate plate 50 against its adjacent disc 32 so that the pump assembly 12 forces air into tire 6 having low air pressure. If a tire 6 has a small leak, this allows the user to continue to ride the bicycle 5 until there are in a location convenient for changing an inner tube of the tire 6.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An inflation device for automatic inflation of a bicycle tire, the tire being rotatably mounted on an axle and including a plurality of spokes, said device including:
    a pump assembly including a housing, said housing having an air inlet and an air outlet, a conduit being fluidly coupled to said air outlet, said housing having a first end wall, a second end wall and a peripheral wall extending between said first and second ends walls;
    a bracket being attached to said housing and being positioned on said peripheral wall, said bracket being adapted for removably securing said housing to one of the spokes;
    an actuator being mechanically coupled to said pump assembly for selectively forcing compressed air outwardly through said air outlet, said actuator including a disc rotatably coupled to said pump assembly wherein rotation of said disc actuates said pump assembly, a rotational axis of said disc being orientated perpendicular to said first end wall of said housing;
    a valve assembly being fluidly coupled to said conduit and being removably coupled to a valve stem of the tire; and
    a plate being removably attached to a frame of a bicycle such that said axle extends through said plate, said plate being selectively abutted against said disc such that said disc rotates when abutting said plate and rotating around the axle.

2. The inflation device of claim 1, wherein said valve assembly includes a tubular member having first end having a female coupler attached thereto for selectively coupling said tubular member to) the valve stem, a male coupler being fluidly coupled to a second end of said tubular member for allowing air flow into said second end of said tubular member.

3. The inflation device of claim 2, said valve assembly further including a secondary inlet being fluidly coupled to said tubular member, a male coupler being attached to a free end of said secondary inlet and comprising a one-way valve for allowing air flow into said secondary inlet and into said tubular member.

4. The inflation device of claim 1, further including a lever assembly being attached said plate for selectively moving said plate in a first position abutting said disc and a second position spaced from said disc, a lever actuator being mechanically coupled to said lever assembly for actuating said lever assembly, said lever actuator being removably attached to the frame.

5. An inflation device for automatic inflation of a bicycle tire, the tire being rotatably mounted on an axle and including a plurality of spokes, said device including:
    a pump assembly including a housing, said housing having an air inlet and an air outlet, a conduit being fluidly coupled to said air outlet, said housing having a first end wall, a second end wall and a peripheral wall extending between said first and second ends walls;
    a bracket being attached to said housing and being positioned on said peripheral wall, said bracket being adopted for removably securing said housing to one of the spokes;
    an actuator being mechanically coupled to said pump assembly for selectively forcing compressed air outwardly through said air outlet, said actuator including a disc rotatably coupled to said pump assembly wherein rotation of said disc actuates said pump assembly, a rotational axis of said disc being orientated perpendicular to said first end wall of said housing;

a valve assembly being fluidly coupled to said conduit and being removably coupled to a valve stem of the tire, said valve assembly including a tubular member having first end having a female coupler attached thereto for selectively coupling said tubular member to the valve stem, a male coupler being fluidly coupled to a second end of said tubular member for allowing air flow into said second end of said tubular member, a secondary inlet being fluidly coupled to said tubular member, a mule coupler being attached to a free end of said secondary inlet and comprising a one-way valve for allowing air flow into said secondary inlet and into said tubular member;

a plate being removably attached to a frame of a bicycle such that said axle extends through said plate, said plate being selectively abutted against said disc such that said disc rotates when abutting said plate and rotating around the axle; and a lever assembly being attached said plate for selectively moving said plate in a first position abutting said disc and a second position spaced from said disc, a lever actuator being mechanically coupled to said lever assembly for actuating said lever assembly, said lever actuator being removably attached to the frame.

\* \* \* \* \*